United States Patent
Davis et al.

(10) Patent No.: US 10,208,613 B2
(45) Date of Patent: Feb. 19, 2019

(54) SEGMENTED SEAL (71) Applicant: UNITED TECHNOLOGIES CORPORATION, Farmington, CT (US)

(72) Inventors: Timothy M Davis, Kennebunk, ME (US); Mark J. Rogers, Kennebunk, ME (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 571 days.

(21) Appl. No.: 14/830,618

(22) Filed: Aug. 19, 2015

(65) Prior Publication Data

US 2016/0115806 A1    Apr. 28, 2016

Related U.S. Application Data (60) Provisional application No. 62/068,462, filed on Oct. 24, 2014.

(51) Int. Cl.
| | | |
|---|---|---|
| *F16J 15/08* | (2006.01) | |
| *F01D 11/00* | (2006.01) | |
| *F01D 25/24* | (2006.01) | |

(52) U.S. Cl.
CPC .......... *F01D 11/005* (2013.01); *F01D 25/246* (2013.01); *F16J 15/0887* (2013.01); *F05D 2240/11* (2013.01); *Y02T 50/672* (2013.01)

(58) Field of Classification Search
CPC .... F16J 15/08; F16J 15/12; F16J 15/02; F16J 15/10; F16J 15/0887; F01D 11/00; F01D 11/005; F01D 9/023
See application file for complete search history.

(56) References Cited

U.S. PATENT DOCUMENTS

| | | | |
|---|---|---|---|
| 4,379,560 A * | 4/1983 | Bakken | F01D 9/023 277/628 |
| 4,783,085 A | 11/1988 | Wicks et al. | |
| 5,014,917 A | 5/1991 | Sirocky et al. | |
| 6,419,237 B1 * | 7/2002 | More | E21B 33/03 277/602 |
| 7,121,790 B2 | 10/2006 | Fokine et al. | |
| 7,347,425 B2 | 3/2008 | James | |
| 7,788,932 B2 * | 9/2010 | Kunitake | F01D 9/023 60/797 |
| 8,651,497 B2 | 2/2014 | Tholen et al. | |
| 9,140,388 B2 * | 9/2015 | Baca | F16J 15/025 |
| 9,341,072 B2 * | 5/2016 | Hanumanthan | F01D 11/005 |
| 2001/0019695 A1 * | 9/2001 | Correia | F01D 5/143 415/135 |
| 2005/0179215 A1 * | 8/2005 | Kono | F01D 11/005 277/628 |
| 2007/0102888 A1 * | 5/2007 | Takahiro | F16J 15/0887 277/603 |
| 2007/0158919 A1 * | 7/2007 | Bennett | F01D 11/005 277/644 |
| 2009/0243228 A1 | 10/2009 | Heinemann et al. | |
| 2013/0113168 A1 | 5/2013 | Lutjen et al. | |

* cited by examiner

*Primary Examiner* — Vishal A Patel (74) *Attorney, Agent, or Firm* — Cantor Colburn LLP (57) ABSTRACT

The present disclosure relates generally to a seal between two circumferential components. The seal comprises a plurality of seal segments disposed adjacent one another by a retaining ring that is at least partially disposed within a cavity formed within each of the plurality of seal segments.

15 Claims, 7 Drawing Sheets

SEGMENTED SEAL

CROSS REFERENCE TO RELATED APPLICATION

This application claims the benefit of and incorporates by reference herein the disclosure of U.S. Ser. No. 62/068,462, filed Oct. 24, 2014.

TECHNICAL FIELD OF THE DISCLOSURE

The present disclosure is generally related to seals and, more specifically, to a segmented seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal can be used to seal or limit secondary flow between segmented or full-hoop turbine components. However, exposure to significant relative deflections between adjacent components and/or elevated temperatures can preclude the use of these types of seals or decrease their longevity. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has less relative flexibility.

Improvements in seal design are therefore needed in the art.

SUMMARY OF THE DISCLOSURE

In one embodiment, a seal for sealing a space defined by first and second circumferential components is disclosed, the seal comprising: a plurality of seal sections, each of the plurality of seal sections defining a cavity formed therein; and a retaining ring at least partially disposed within the respective cavities of each of the plurality of seal sections.

In another embodiment of the above, the plurality of seal sections comprises a full hoop circumferential segmented seal.

In another embodiment of any of the above, each of the plurality of seal sections comprises: a base extending substantially in an axial direction; a first leg extending from the base substantially in a radial direction; and a second leg extending from the base substantially in the radial direction; wherein the cavity is defined between the first and second legs.

In another embodiment of any of the above, a first lip is disposed on the first leg and extending into the first cavity; and a second lip is disposed on the second leg and extending into the first cavity, wherein a first axial dimension of the retaining ring is greater than a second axial distance between the first and second lips.

In another embodiment of any of the above, the base includes a first substantially rounded end in contact with the first component along a first arcuate line of contact and a second substantially rounded end in contact with the second component along a second arcuate line of contact.

In another embodiment of any of the above, the retaining ring comprises a split ring including a first end and a second end.

In another embodiment of any of the above, a keeper-seal segment comprises a body defining a second cavity and a third cavity therein, wherein the first end of the retaining ring is disposed within the second cavity and the second end of the retaining ring is disposed within the third cavity.

In another embodiment of any of the above, a first compliant seal is disposed between the base and the first component; and a second compliant seal is disposed between the base and the second component; wherein the first and second compliant seals form respective seals with the first and second components.

In another embodiment of any of the above, the first and second compliant seals comprise braided ceramic rope seals.

In another embodiment of any of the above, the plurality of seal sections are formed from a material selected from one of a high-temperature metal alloy, a high-temperature ceramic material, and a high-temperature ceramic composite, or a combination of two or more of a high-temperature metal alloy, a high-temperature ceramic fiber material and a high-temperature ceramic fiber composite.

In another embodiment, a system is disclosed, comprising: a first circumferential component disposed about a centerline and including a first surface; a second circumferential component disposed about the centerline and including a second surface, the second circumferential component disposed adjacent the first circumferential component and defining a seal cavity therebetween; and a seal disposed in the seal cavity, the seal including: a plurality of seal sections, each of the plurality of seal sections defining a first cavity formed therein; and a retaining ring at least partially disposed within the respective first cavities of each of the plurality of seal sections.

In another embodiment of the above, the plurality of seal sections comprises a full hoop circumferential segmented seal.

In another embodiment of any of the above, each of the plurality of seal sections comprises: a base extending substantially in an axial direction; a first leg extending from the base substantially in a radial direction; and a second leg extending from the base substantially in the radial direction; wherein the cavity is defined between the first and second legs.

In another embodiment of any of the above, a first lip is disposed on the first leg and extending into the first cavity; and a second lip disposed on the second leg and extending into the first cavity, wherein a first axial dimension of the retaining ring is greater than a second axial distance between the first and second lips.

the base includes a first substantially rounded end in contact with the first component along a first arcuate line of contact and a second substantially rounded end in contact with the second component along a second arcuate line of contact.

In another embodiment of any of the above, the retaining ring comprises a split ring including a first end and a second end.

In another embodiment of any of the above, a keeper-seal segment comprises a body defining a second cavity and a third cavity therein, wherein the first end of the retaining ring is disposed within the second cavity and the second end of the retaining ring is disposed within the third cavity.

In another embodiment of any of the above, a first compliant seal is disposed between the base and the first component; and a second compliant seal is disposed between the base and the second component; wherein the first and second compliant seals form respective seals with the first and second components.

In another embodiment of any of the above, the first and second compliant seals comprise braided ceramic rope seals.

In another embodiment, a seal section is disclosed, a plurality of which form a seal for sealing a space defined by first and second circumferential components, the seal section comprising: a base extending substantially in an axial direction, the base including: a first substantially rounded end in contact with the first component along a first arcuate line of contact; and a second substantially rounded end in contact with the second component along a second arcuate line of contact; a first leg extending from the base substantially in a radial direction; a second leg extending from the base substantially in the radial direction; and a cavity defined between the first and second legs.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
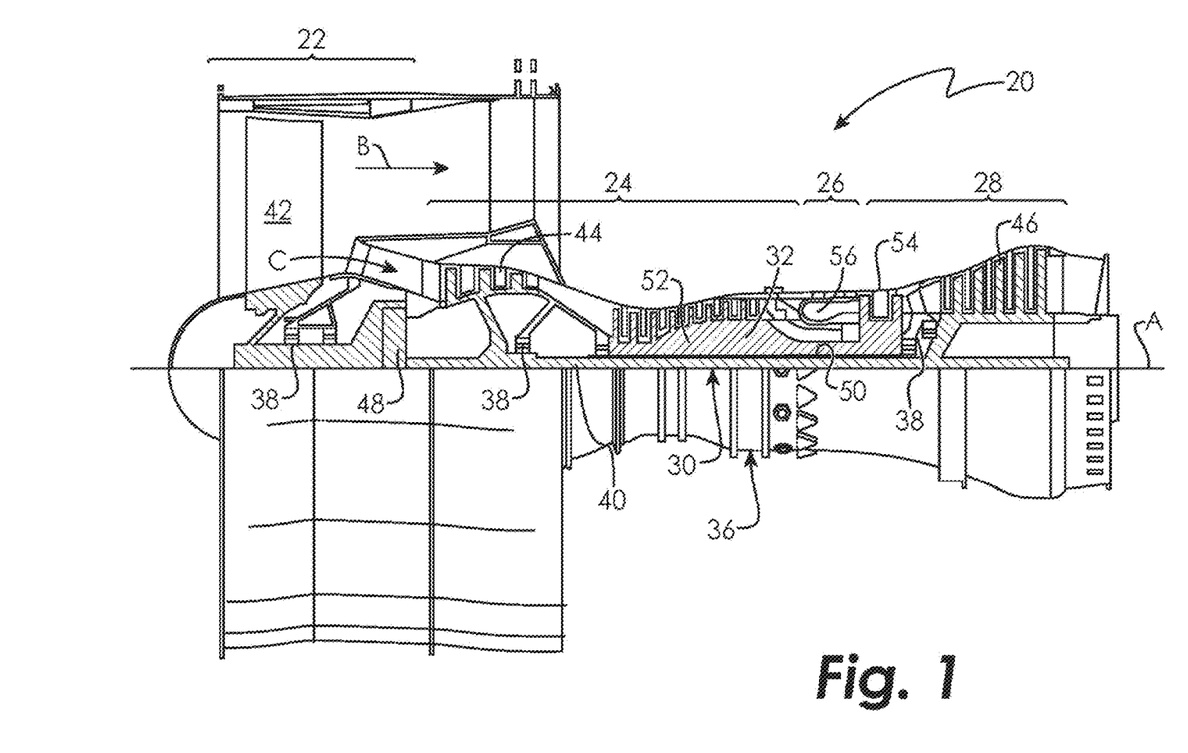
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
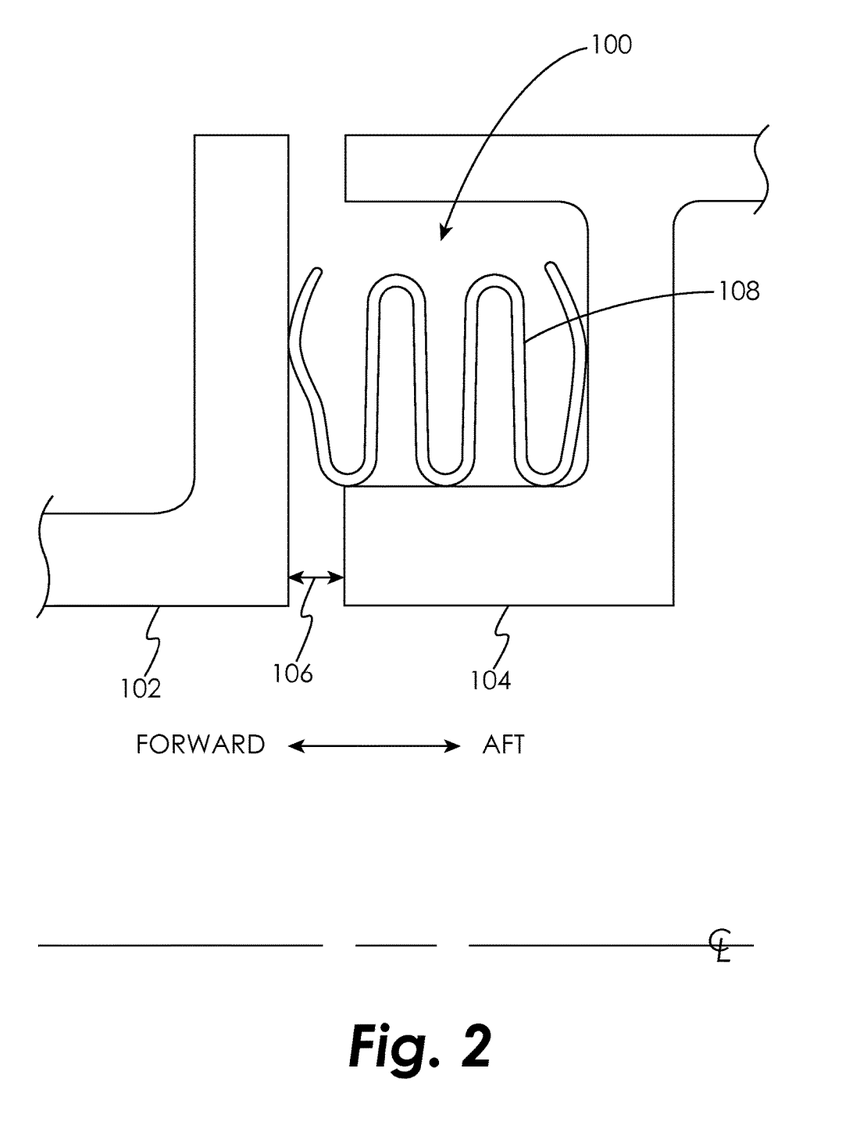
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop circumferential turbine components 102 and 104 which may move axially, radially, and/or circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies an annular w-seal 108 formed from a material appropriate to the anticipated operating conditions (e.g., deflection, temperature, pressure, etc.) of the w-seal 108, such a nickel-based alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3:
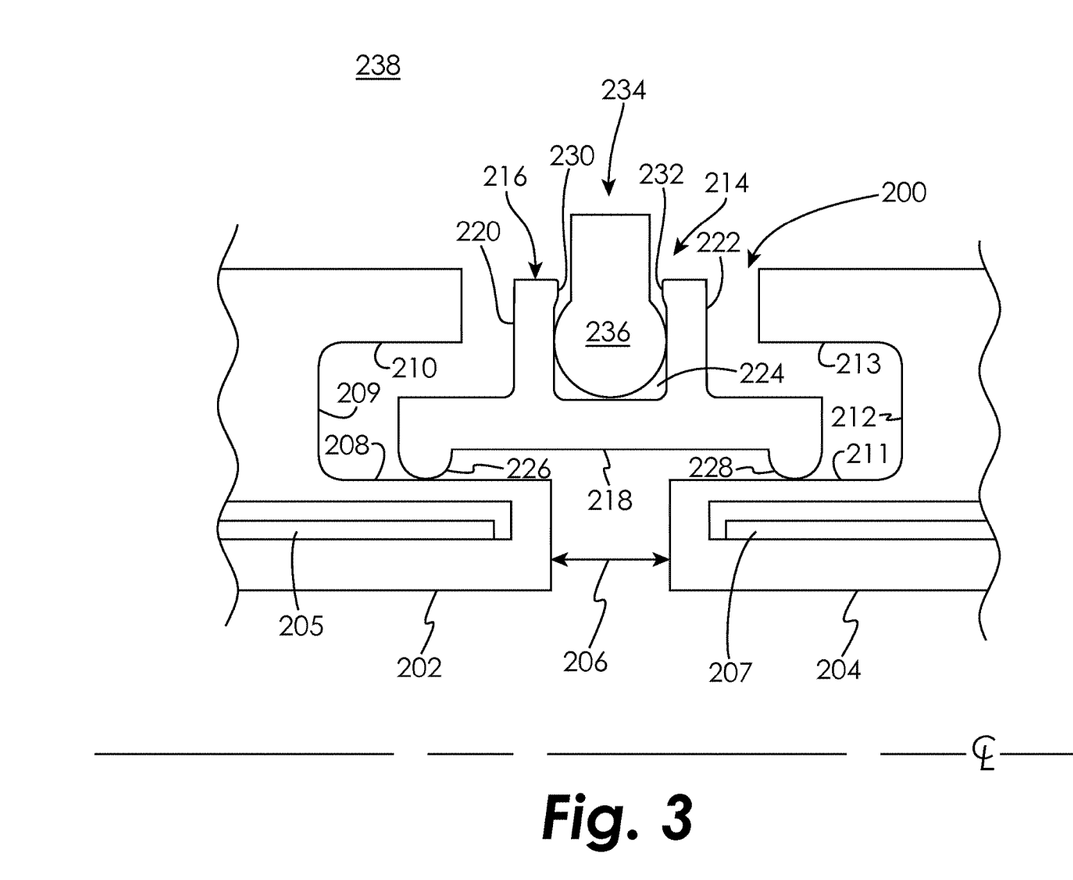
FIG. 3 is a schematic cross-sectional view of a seal and seal cavity in an embodiment.
Figure 4:
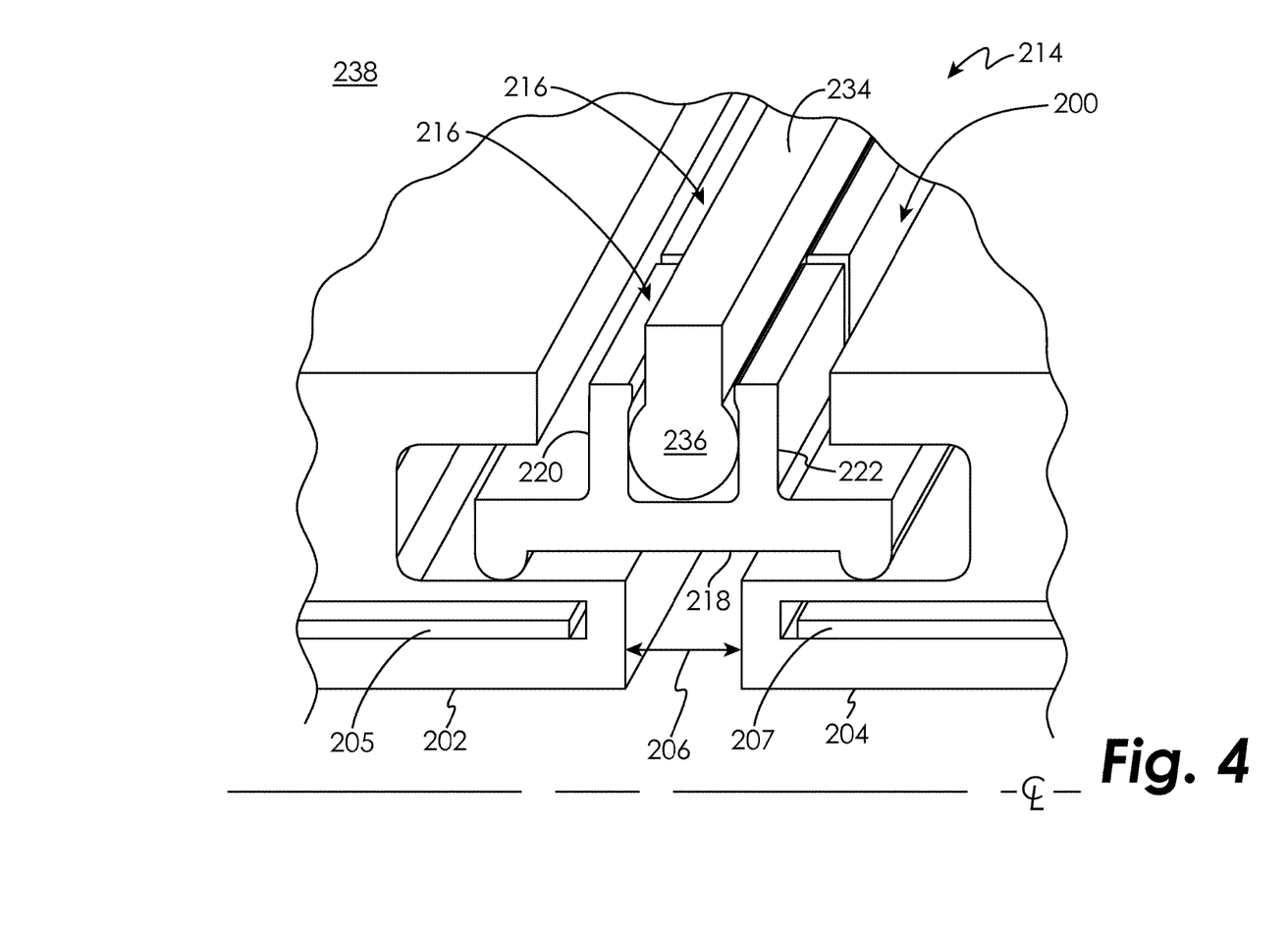
FIG. 4 is a schematic perspective view of a seal and seal cavity in an embodiment.

FIG. 3 schematically illustrates a cross-sectional view of one embodiment of a seal cavity 200 formed by two axially-adjacent segmented or full hoop circumferential turbine components 202 and 204 which may move axially, radially, and circumferentially relative to one another about an axial centerline of the turbine engine. FIG. 4 schematically illustrates a perspective view of the seal cavity 200. A nominal design clearance 206 exists between the components 202 and 204. A feather seal 205 may extend through adjacent components 202 while a feather seal 207 may extend through adjacent components 204. Component 202 includes a radially inner surface 208, axially forward surface 209, and radially outer surface 210, each facing the seal cavity 200. Similarly, and component 204 includes a radially inner surface 211, axially aft surface 212, and radially outer surface 213, each facing the seal cavity 200. Within the seal cavity 200 lies a seal 214 formed from a material appropriate to the anticipated operating conditions of the seal 214, such as a high-temperature metal alloy, a high temperature ceramic material, a high temperature ceramic composite, or a combination of two or more of these, to name just a few non-limiting examples. The seal 214 is formed from a plurality of seal segments 216 (FIG. 4) disposed adjacent one another to form the full hoop circumferential segmented seal 214. Each seal segment 216 includes an annular base 218 extending substantially in the axial direction. Each seal segment 216 further includes a first leg 220 and a second leg 222, each extending substantially in the radial direction and defining a cavity 224 therebetween. The seal 214 may include a coating and/or a sheath to provide increased wear resistance.

In an embodiment, the base 218 includes a forward substantially rounded end 226 in contact with the surface 208 such that the base 218 contacts the surface 208 along a single arcuate (i.e., at least partially encapsulating, circumscribing, or surrounding a portion of a circle) line of contact. As used herein, the phrase "arcuate line of contact" includes lines with some axial thickness. The base 218 also includes an aft substantially rounded end 228 in contact with the surface 211 such that the base 218 contacts the surface 211 along a single arcuate line of contact. The leg 220 includes a lip 230 extending from an aft side thereof into the cavity 224. The leg 222 includes a lip 232 extending from a forward side thereof into the cavity 224. In some embodiments, the seal segments may seal against the radial walls 209, 212 instead of or in addition to the axial surfaces 208, 211.

The plurality of seal segments 216 that comprise the full hoop circumferential segmented seal 214 are maintained in position by a retaining ring 234 extending through the cavity 224 of each of the seal segments 216. The retaining ring 234 may be formed as a split ring in an embodiment. The retaining ring 234 serves to radially, axially, and circumferentially align the seal segments 216, as well as to load them radially inward. In an embodiment, an axial dimension of the retaining ring 234 within the cavity 224 is greater than the axial distance between the lips 230 and 232 such that the lips 230 and 232 allow the retaining ring 234 to retain the seal segments 216 during assembly and disassembly of the seal 214. In one embodiment, the retaining ring 234 includes a rounded radially inner end 236 within the cavity 224. In some embodiments, a portion of the retaining ring 234 forms an interference fit with a portion of the cavity 224.

Figure 5:
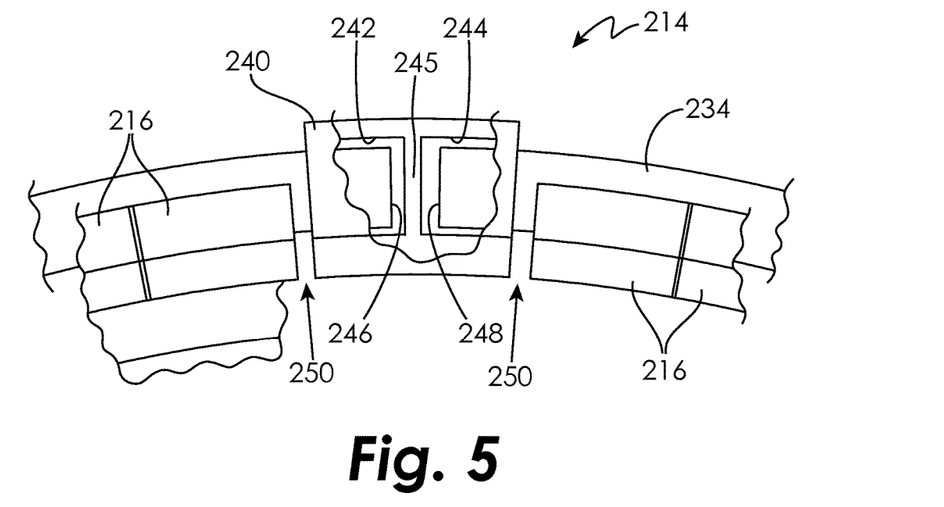
FIG. 5 is a schematic partial cross-sectional view of a seal in an embodiment.

FIG. 5 schematically illustrates an embodiment of a retaining ring 234 keeper-seal segment 240 located at a single circumferential location of the seal 214. The retaining ring 234 keeper-seal segment 240 includes a first cavity 242 and a second cavity 244 formed into opposite ends thereof. In an embodiment, a wall 245 is disposed between the first cavity 242 and the second cavity 244. An end 246 of the retaining ring 234 (at the single split location) is received inside first cavity 242 within the keeper-seal segment 240, while an end 248 of the retaining ring 234 is received inside second cavity 244. The base of the 234 keeper-seal segment 240 is shaped like the base 218 of the seal segments 216, thus providing sealing to the surfaces 208 and 211 in the area of the split in the retaining ring 234. The free-state diameter of the retaining ring 234 may be sized in various embodiments to either achieve a small gap to the wall 245 or to maintain a small circumferential preload against the wall 245. In some embodiments, circumferential gaps 250 may be sized as small as possible to minimize leakage at steady state conditions. In an embodiment, the gaps 250 are sized to permit limited circumferential lock-up of the seal segments 216 during a worst-case transient condition. Lock-up of the seal segments 216 would simply cause them to temporarily lift off the surfaces 208 and 211 and leak slightly more during the transient condition. Although the sum of all the circumferential gaps is depicted in FIG. 5 entirely at the two locations 250, the total circumferential gap will actually be randomly distributed among the various intersegment interfaces around the circumference. The keeper-seal segment 240 ensures good axial, radial, and rotational alignment between the retaining ring 234 ends 246, 248, but in some embodiments the keeper-seal segment 240 is not present and it is replaced with a seal segment 216.

In an embodiment, the seal segments 216 may be formed by using wire electrical discharge machining (WEDM) to slice the seal segments 216 from a ring machined to the final cross-sectional shape of the seal segments 216. In an embodiment, keeper-seal segment 240 may be machined conventionally. In another embodiment, the keeper-seal segment 240 may be formed using plunge electrical discharge machining (EDM). In another embodiment, keeper-seal segment 240 may be formed using an additive manufacturing technique, such as direct metal laser sintering (DMLS). Assembly of the seal 214 may be performed on a bench by sliding each seal segment 216 onto the retaining ring 234, starting at either or both of the ends 246, 248, followed by inserting both ends 246, 248 into the keeper-seal segment 240. The seal assembly 214 may then be assembled, as a single unit, into either of the components 202, 204. The seal assembly may be temporarily held in place on the component 202, 204 during assembly of the remaining engine (or other device in which the seal 214 is being used) components by means of a substance that will vaporize at the operating temperature of the engine, such as wax and/or glue to name just two non-limiting examples.

Figure 6:
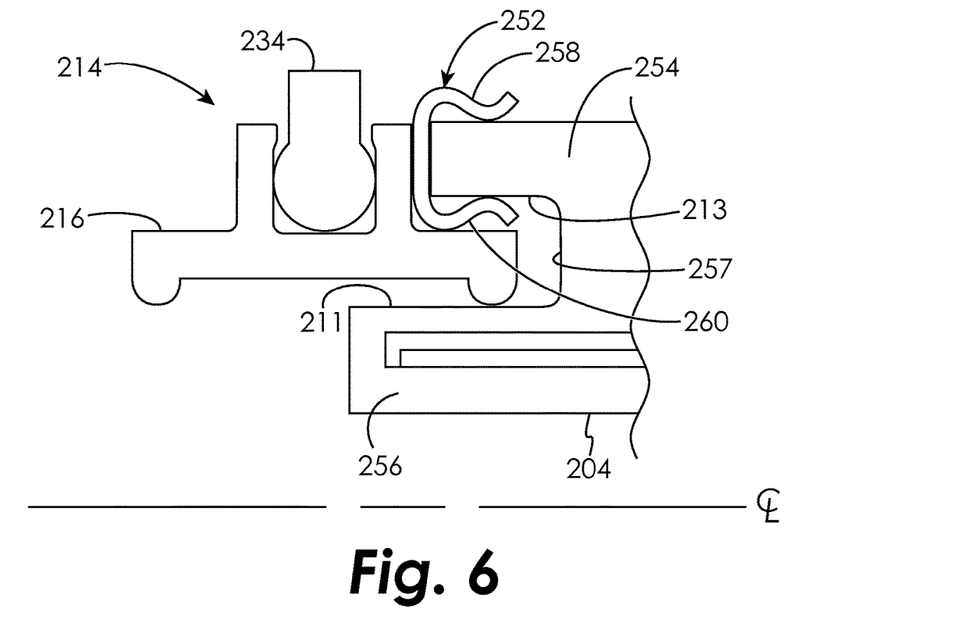
FIG. 6 is a schematic cross-sectional view of a seal and seal cavity in an embodiment.
Figure 7:
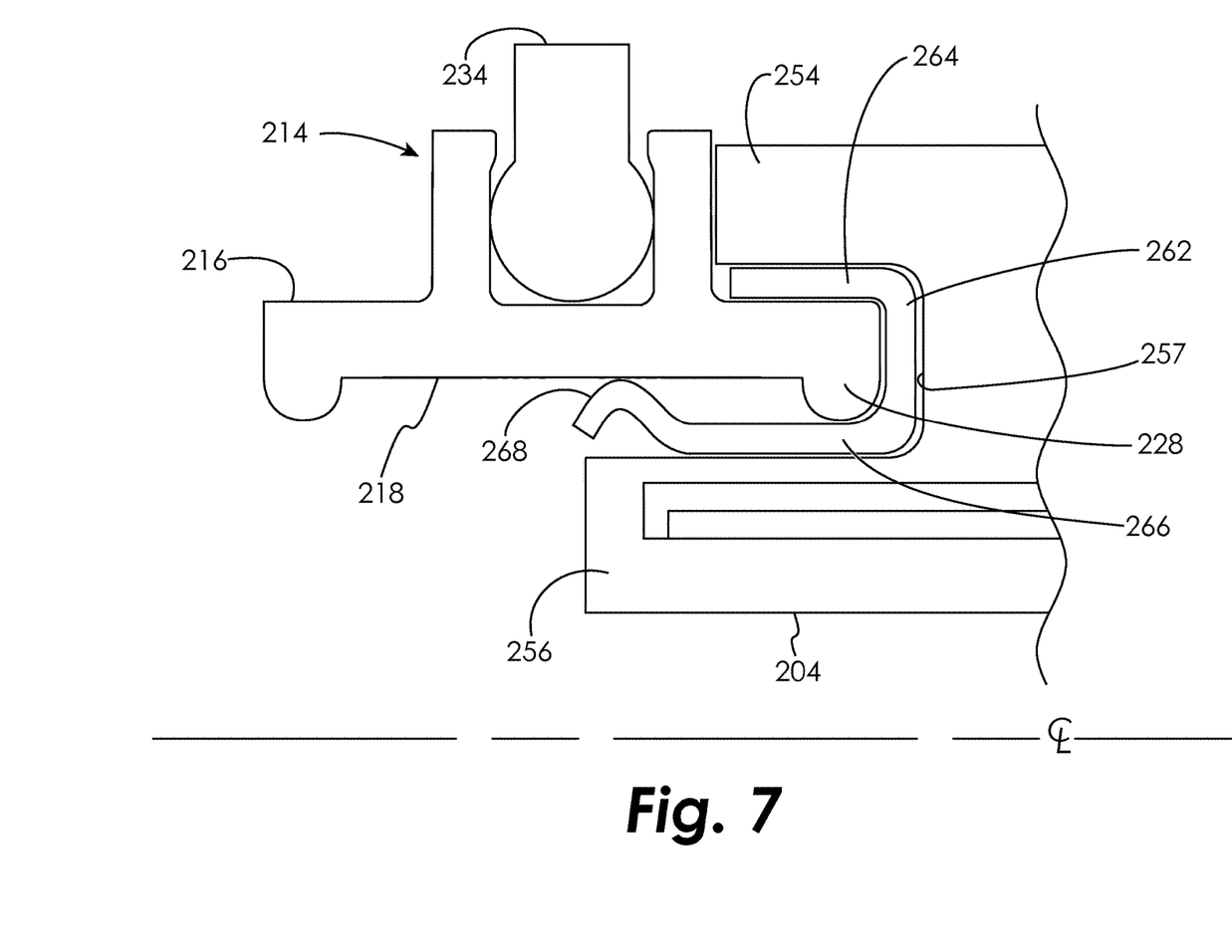
FIG. 7 is a schematic view of a seal and seal cavity in an embodiment.

Alternatively, FIGS. 6 and 7 schematically illustrate two embodiments of vaporizing clip arc segments that may be used to hold the seal 214 in place during engine assembly. As shown in FIG. 6, a clip arc segment 252 may be installed over a wall 254 of the component 204 defining the upper surface 213 (as illustrated), or over a wall 256 defining the lower surface 211, of the cavity 257 in which the seal 214 is partially disposed. Clip arc segment 252 may be analogously installed on component 202 if the seal 214 is to be installed on component 202. Clip arc segment 252 includes a first arm 258 and a second arm 260. A quiescent radial distance between the first arm 258 and the second arm 260 is slightly less than the radial thickness of the wall 254, therefore flexing of the first arm 258 and the second arm 260 retains the clip arc segment 252 upon the wall 254. Furthermore, the radial thickness of the second arm 260 and the portion of the seal 214 disposed within the cavity is approximately the same as the radial dimension of the cavity 257. Once inserted, seal segment 216 motion/rotation is sufficiently restricted to enable the opposite component 202, 204 to be installed, completing the assembly. The clip arc segment 252 may be formed from a polymer such as polyethylene that will vaporize at the normal operating temperature of the engine, to name one non-limiting embodiment.

As shown in FIG. 7, a clip arc segment 262 may be inserted into the cavity 257. The clip arc segment 262 includes a first arm 264 and a second arm 266. The seal segment 216 is inserted between the first arm 264 and the second arm 266. A radial distance between the first arm 264 and the second arm 266 is approximately the same as the radial dimension of the portion of the seal segment 216 disposed therebetween. For seal segment 216 embodiments that include the substantially rounded end 228 on the base 218, the second arm 266 may include a radial extension 268 thereon to support the base 218. Once inserted, seal segment 216 motion/rotation is sufficiently restricted to enable the opposite component 202, 204 to be installed, completing the assembly. As with the clip arc segment 252, the clip arc segment 262 may be formed from a polymer such as polyethylene that will vaporize at the normal operating temperature of the engine, to name one non-limiting embodiment. Both of the clip arc segment 252 and the clip arc segment 262 may be formed with an arc length that is longer than the arc length of individual seal segments 216 so that seal segment 216 rotation is significantly restricted.

Pressure in a secondary flow cavity 238 is transmitted to the seal cavity 200 through an opening defined by the components 202, 204. This pressure acts upon the surfaces of the seal sections 216, thereby causing the bases 218 to seat against the surface 208 of the component 202 and the surface 211 of the component 204. The legs 220 and 224 increase the piston area upon which the pressure in the secondary flow cavity 238 operates, thereby causing the seal sections 216 to significantly load (and thereby seal) against the surfaces of the components 202 and 204. The load applied by the retaining ring 234 to the seal segments 216 additionally helps base 218 to seat against the surfaces 208 and 211, such as during engine transport and engine start-up, for example. This prevents most or all of the secondary flow cavity 238 gases from reaching the design clearance 206 area.

Figure 8:
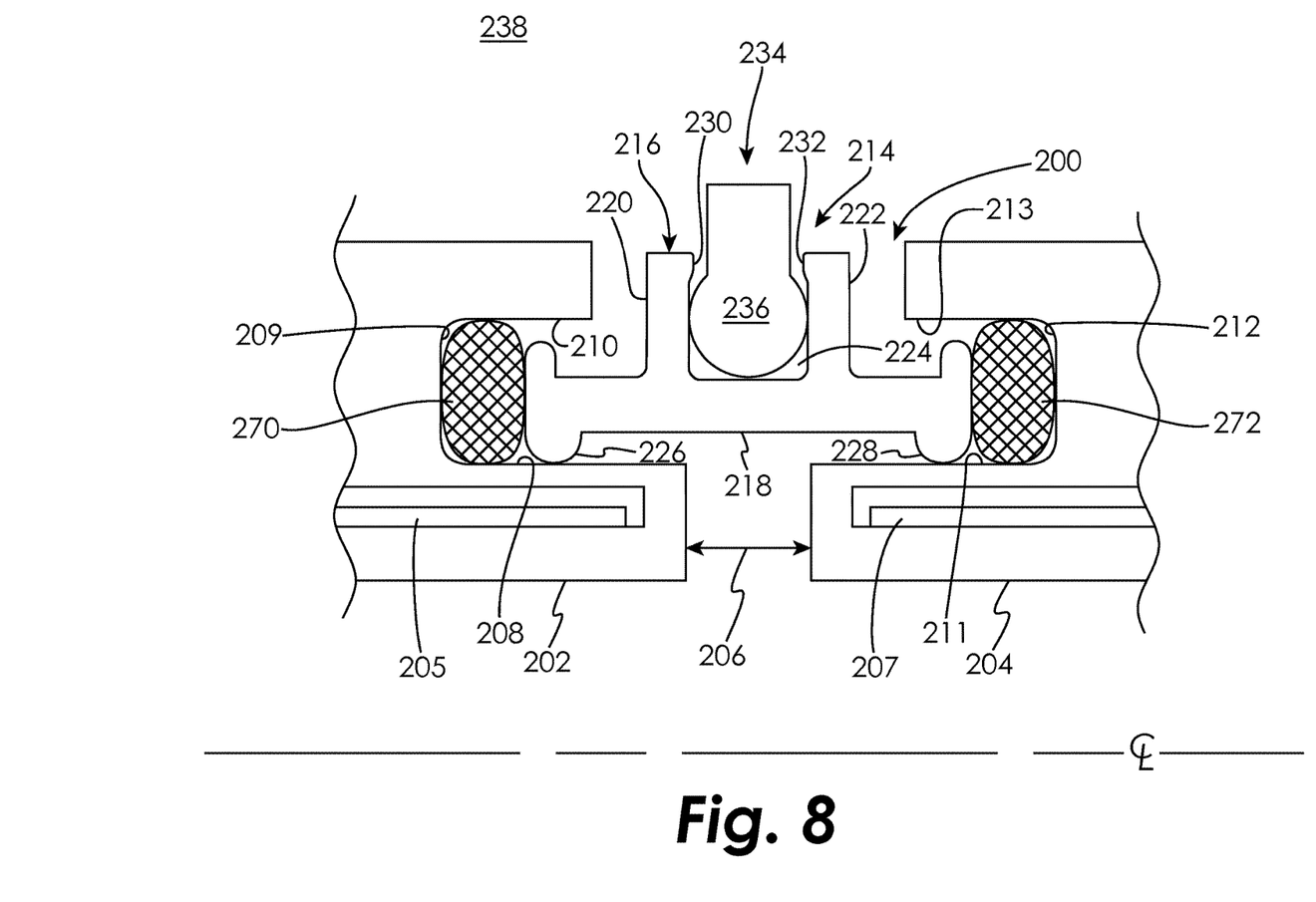
FIG. 8 is a schematic cross-sectional view of a seal and seal cavity in an embodiment.

In the embodiment illustrated in FIG. 8, a compliant seal 270 (e.g., a rope seal) may be disposed between the seal segment 216 and the wall 209 of component 202, while a compliant seal 272 may be disposed between the seal segment 216 and the wall 212 of component 204. In an embodiment, containment of the compliant seal 270 may be improved by providing a radial extension 276 on a forward side of the seal segment 216, while containment of the compliant seal 272 may be improved by providing a radial extension 278 on an aft side of the seal segment 216.

Unlike the seal 108, the seal 214 is not deflected as the components 202 and 204 move relative to each other during engine assembly and engine operation. Since each seal segment 216 is able to rotate or rock on the retaining ring 234 independently of its neighboring seal segment 216, both sealing surfaces of the base 218 are able to better conform to radial stair-stepping and chording associated with component tolerances and thermal/mechanical loading of the components 202 and 204. Therefore, sealing is maintained while the components 202 and 204 and the components of the seal 214 move relative to one another. Because the seal sections 216 rotate and slide with respect to the components 202, 204, the seal 214 is not substantially deflected by the relative movement between the components 202 and 204 and the seal sections 216 may be formed from significantly thicker material than that used in the w-seal 108.

Additionally, the seal 214 can be made from a lower strength material, such as cobalt alloys to name just one non-limiting example, that may be lower cost, have higher temperature capability, be more manufacturable, and/or more wear-resistant because thicker material may be used and lower strength lubricious material may be used. Additionally, the seal is less susceptible to distortion or breakage, which can cause leakage of gas past the seal 214 and/or liberation of the seal. Furthermore, the seal 214 exhibits improved vibration tolerance due to friction damping While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed:

1. A seal for sealing a space defined by first and second circumferential components, the seal comprising:
a plurality of seal sections, each of the plurality of seal sections having a base extending substantially in an axial direction; a first leg extending away from a first planar side of the base substantially in a radial direction; and a second leg extending away from the first planar side of the base substantially in the radial direction, the base further including a first substantially rounded end integrally formed with a second planar side of the base and in contact with the first component along a first arcuate line of contact and a second substantially rounded end integrally formed with the second planar side of the base and in contact with the second component along a second arcuate line of contact, wherein the first planar side of the base is opposite and parallel to the second planar side of the base; and wherein a cavity is defined between the first and second legs on the first side of the base; and
a retaining ring at least partially disposed within the respective cavities of each of the plurality of seal sections.

2. The seal of claim 1, wherein the plurality of seal sections comprises a full hoop circumferential segmented seal.

3. The seal of claim 1, further comprising: a first lip disposed on the first leg and extending into the first cavity; and a second lip disposed on the second leg and extending into the first cavity, wherein a first axial dimension of the retaining ring is greater than a second axial distance between the first and second lips.

4. The seal of claim 1, wherein the retaining ring comprises a split ring including a first end and a second end.

5. The seal of claim 4, further comprising: a keeper-seal segment comprising a body defining a second cavity and a third cavity therein, wherein the first end of the retaining ring is disposed within the second cavity and the second end of the retaining ring is disposed within the third cavity.

6. The seal of claim 1, further comprising: a first compliant seal disposed between the base and the first component; and a second compliant seal disposed between the base and the second component; wherein the first and second compliant seals form respective seals with the first and second components.

7. The seal of claim 6, wherein the first and second compliant seals comprise braided ceramic rope seals.

8. The seal of claim 1, wherein the plurality of seal sections are formed from a material selected from one of a high-temperature metal alloy, a high-temperature ceramic material, and a high-temperature ceramic composite, or a combination of two or more of a high-temperature metal alloy, a high-temperature ceramic fiber material and a high-temperature ceramic fiber composite.

9. A system, comprising:
a first circumferential component disposed about a centerline and including a first surface;
a second circumferential component disposed about the centerline and including a second surface, the second circumferential component disposed adjacent the first circumferential component and defining a seal cavity therebetween; and
a seal disposed in the seal cavity, the seal including: a plurality of seal sections, each of the plurality of seal sections having a base extending substantially in an axial direction; a first leg extending away from a first planar side of the base substantially in a radial direction; and a second leg extending away from the first planar side of the base substantially in the radial direction, the base further including a first substantially rounded end integrally formed with a second planar side of the base and in contact with the first component along a first arcuate line of contact and a second substantially rounded end integrally formed with the second planar side of the base and in contact with the second component along a second arcuate line of contact, wherein the first planar side of the base is opposite and parallel to the second planar side of the base; and wherein a cavity is defined between the first and second legs on the first side of the base; and
a retaining ring at least partially disposed within the respective first cavities of each of the plurality of seal sections.

10. The seal of claim 9, wherein the plurality of seal sections comprises a full hoop circumferential segmented seal.

11. The seal of claim 9, further comprising: a first lip disposed on the first leg and extending into the first cavity; and a second lip disposed on the second leg and extending into the first cavity, wherein a first axial dimension of the retaining ring is greater than a second axial distance between the first and second lips.

12. The seal of claim 9, wherein the retaining ring comprises a split ring including a first end and a second end.

13. The seal of claim 12, further comprising: a keeper-seal segment comprising a body defining a second cavity and a third cavity therein, wherein the first end of the retaining ring is disposed within the second cavity and the second end of the retaining ring is disposed within the third cavity.

14. The seal of claim 9, further comprising: a first compliant seal disposed between the base and the first component; and a second compliant seal disposed between the base and the second component; wherein the first and second compliant seals form respective seals with the first and second components.

15. The seal of claim 14, wherein the first and second compliant seals comprise braided ceramic rope seals.

* * * * *

UNITED STATES PATENT AND TRADEMARK OFFICE
CERTIFICATE OF CORRECTION

| | | |
|---|---|---|
| PATENT NO. | : 10,208,613 B2 | Page 1 of 1 |
| APPLICATION NO. | : 14/830618 | |
| DATED | : February 19, 2019 | |
| INVENTOR(S) | : Timothy M. Davis and Mark J. Rogers | |

It is certified that error appears in the above-identified patent and that said Letters Patent is hereby corrected as shown below:

In the Claims

Column 10, Claim 9, Line 29 please replace "respective first cavities" with "respective cavities".

Signed and Sealed this
Eighteenth Day of June, 2019

Andrei Iancu
*Director of the United States Patent and Trademark Office*